(12) United States Patent
Nakano et al.

(10) Patent No.: US 8,340,047 B2
(45) Date of Patent: Dec. 25, 2012

(54) INTEGRATED ANTENNA DEVICE, INTEGRATED DEMODULATING DEVICE, AND INTEGRATED RECEIVING DEVICE

(75) Inventors: Mansaku Nakano, Kobe (JP); Kohichi Tsutsui, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 432 days.

(21) Appl. No.: 12/601,449

(22) PCT Filed: May 7, 2008

(86) PCT No.: PCT/JP2008/058484
§ 371 (c)(1),
(2), (4) Date: Nov. 23, 2009

(87) PCT Pub. No.: WO2008/146578
PCT Pub. Date: Dec. 4, 2008

(65) Prior Publication Data
US 2010/0195550 A1 Aug. 5, 2010

(30) Foreign Application Priority Data
May 25, 2007 (JP) ................................. 2007-139321

(51) Int. Cl.
*H04W 4/00* (2009.01)
(52) U.S. Cl. .............................. 370/331; 455/39; 455/42
(58) Field of Classification Search .......... 370/310–350; 455/42–72
See application file for complete search history.

(56) References Cited

U.S. PATENT DOCUMENTS

| 5,280,636 A | 1/1994 | Kelley et al. |
| 2007/0040947 A1* | 2/2007 | Koga ............................ 348/725 |
| 2007/0274222 A1* | 11/2007 | Kanno .......................... 370/241 |

FOREIGN PATENT DOCUMENTS

| JP | A-61-208394 | 6/1986 |
| JP | A-05-183459 | 7/1993 |
| JP | A-10-190500 | 7/1998 |
| JP | A-10-336066 | 12/1998 |
| JP | A-2000-324003 | 11/2000 |
| JP | A-2001-177474 | 6/2001 |
| JP | A-2004-180118 | 6/2004 |
| JP | A-2005-197854 | 7/2005 |

OTHER PUBLICATIONS

International Search Report issued in International Application No. PCT/JP2008/058484; Mailed on Jul. 1, 2008.

* cited by examiner

*Primary Examiner* — Charles C Jiang
(74) *Attorney, Agent, or Firm* — Oliff & Berridge, PLC

(57) ABSTRACT

An integrated antenna device includes: a multiplexing processing portion for multiplexing received signals received at antennas of mutually different signal systems; a serial communication portion for outputting a multiplex signal to the outside and for receiving a control signal from the outside; a power-feeding switch for individually controlling power feeding of tuner units on the basis of the received control signal; and a pseudo-signal generating portion for generating a pseudo-signal that simulates a signal input to the multiplexing processing portion. The multiplexing processing portion uses the pseudo-signal generated at the pseudo-signal generating portion instead of a received signal corresponding to a tuner unit that is stopped from being fed power by the power-feeding switch.

10 Claims, 7 Drawing Sheets

INTEGRATED ANTENNA DEVICE, INTEGRATED DEMODULATING DEVICE, AND INTEGRATED RECEIVING DEVICE

This application is the U.S. national phase of international application PCT/JP2008/058484, filed on May 7, 2008, which designated the U.S. and claims priority to JP Application No. 2007-139321, filed on May 25, 2007. The entire contents of these applications are incorporated herein by reference.

TECHNICAL FIELD

The present invention relates to an integrated antenna device that receives broadcasting waves of a plurality of systems using a plurality of antennas, to an integrated demodulating device that demodulates the received broadcasting waves, and to an integrated receiving device that includes the integrated antenna device and the integrated demodulating device.

BACKGROUND ART

As such an integrated receiving device, an on-board receiving device 700 for receiving three kinds of broadcasting waves of AM, FM, and digital TV conventionally used to, as shown in FIG. 1: input received signals from antennas 710, 720, and 730 to a receiving device housing 900 through high-frequency power-feeding lines 800 such as coaxial cables; frequency-convert the received signals at dedicated tuner units 911, 921, and 931 that are provided in the receiving device housing 900 and differ from each other on a system basis; and demodulate the signals at band pass filters 912, 922, and 932, AD conversion portions 913, 923, and 933, and demodulation processing portions 914, 924, and 934, which are all provided at post-stages of the tuner units.

Then, among the demodulated signals, a signal selected by a user's handling of a switch or the like was output as an audio signal or a video signal to one of output devices of a plurality of systems such as a speaker and a liquid crystal display.
[Patent document 1] Japanese Unexamined Patent Publication No. 2000-324003.
[Patent document 2] Japanese Unexamined Patent Publication No. 5-183459.

DISCLOSURE OF THE INVENTION

Problems that the Invention is to Solve

However, with the above-described conventional integrated receiving device, the tuner units 911, 921, and 931 are in a power-fed state regardless of which signal is being selected, and thus a high-frequency component of the signal input to each of the tuner units 911, 921, and 931 may travel over to the other tuner units, resulting in line noise, or radiation noise may result from an electromagnetic wave or the like that is based on, for example, the signals input to the tuner units 911, 921, and 931 and harmonics of local oscillation portions. When such noise occurs, the other tuner units may be adversely affected.

In view of the above-described conventional problems, it is an object of the present invention to provide an integrated antenna device, an integrated demodulating device, and an integrated receiving device that are capable of, when broadcasting waves of a plurality of systems are received at a plurality of tuner units from a plurality of antennas, reducing noise that results from received signals input to the other tuner units.

Means of Solving the Problems

In order to accomplish the above object, a feature configuration of an integrated antenna device according to the present invention is as follows. The integrated antenna device is disposed near a plurality of antennas of mutually different signal systems and includes: a plurality of tuner units each having a frequency converting portion for converting a high frequency signal received at a corresponding one of the antennas into an intermediate frequency signal; an AD converting portion for converting output signals of the tuner units into digital signals; a multiplexing processing portion for multiplexing the received digital signals AD-converted at the AD converting portion; a serial communication portion for outputting to an outside a received multiplex digital signal multiplexed at the multiplexing processing portion and for receiving a control signal from the outside; a power-feeding switch for individually controlling power feeding of the tuner units on the basis of the control signal received at the serial communication portion; and a pseudo-signal generating portion for generating a pseudo-signal that simulates an output signal of the AD converting portion, wherein the multiplexing processing portion uses the pseudo-signal generated at the pseudo-signal generating portion instead of a received digital signal corresponding to a tuner unit that is stopped from being fed power by the power-feeding switch.

With above-described configuration, the power-feeding switch stops power feeding of, for example, a tuner unit that need not be fed power at present on the basis of the control signal transmitted from the outside through the serial communication portion. As a result, the number of tuner units that are maintained at power-fed state decreases, thereby reducing occurrence of noise that conventionally resulted from a received signal input to a tuner unit that was fed power in spite of unnecessity for power feeding.

Effects of the Invention

As has been described hereinbefore, the present invention has made it possible to provide an integrated antenna device, an integrated demodulating device, and an integrated receiving device that are capable of, when broadcasting waves of a plurality of systems are received at a plurality of tuner units from a plurality of antennas, reducing noise that results from received signals input to the other tuner units and from local oscillation portions.

BRIEF DESCRIPTION OF THE DRAWINGS

FIG. 4B is a block configuration diagram of a tuner unit that receives digital broadcasting waves of a digital TV, a digital radio, and the like.

DESCRIPTION OF REFERENCE NUMERAL

Figure 1:
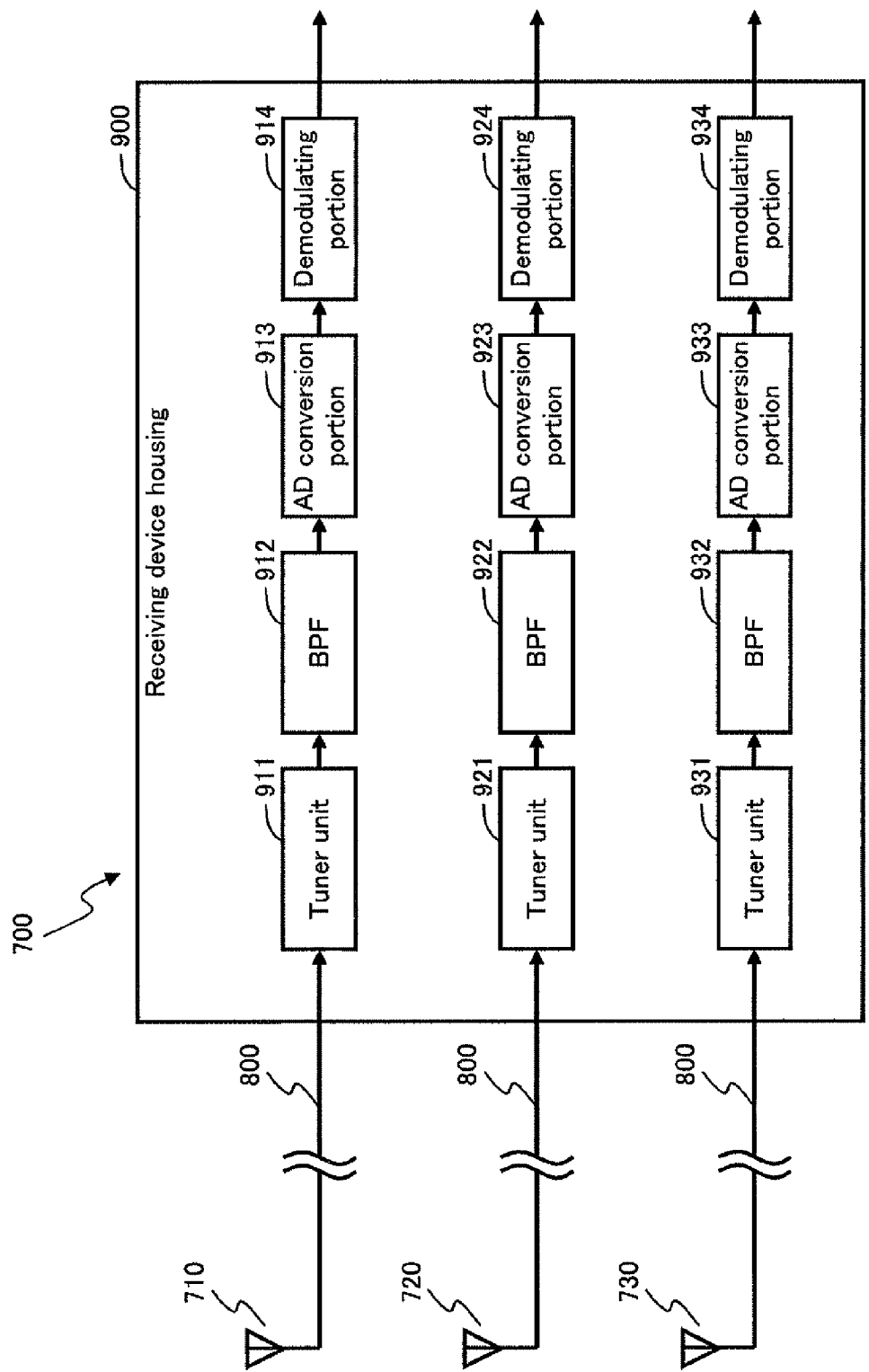
FIG. 1 is a block configuration diagram of a conventional vehicle-dedicated receiving device.

1: Integrated receiving device
3: Integrated antenna device
31: Tuner unit
321: AD conversion portion
33: Multiplexing processing portion
34: Serial communication portion
35: Power-feeding switch
36: Pseudo-signal generating portion
4: Integrated demodulating device
41: Serial communication portion
42: Separation processing portion
43: Demodulating portion
44: Control portion
52: Operation portion
55: Power source control portion
56: Power-feeding control table

BEST MODE FOR CARRYING OUT THE INVENTION

The following describes embodiments that apply the integrated antenna device, the integrated demodulating device, and the integrated receiving device according to the present invention to a vehicle.

Figure 2:
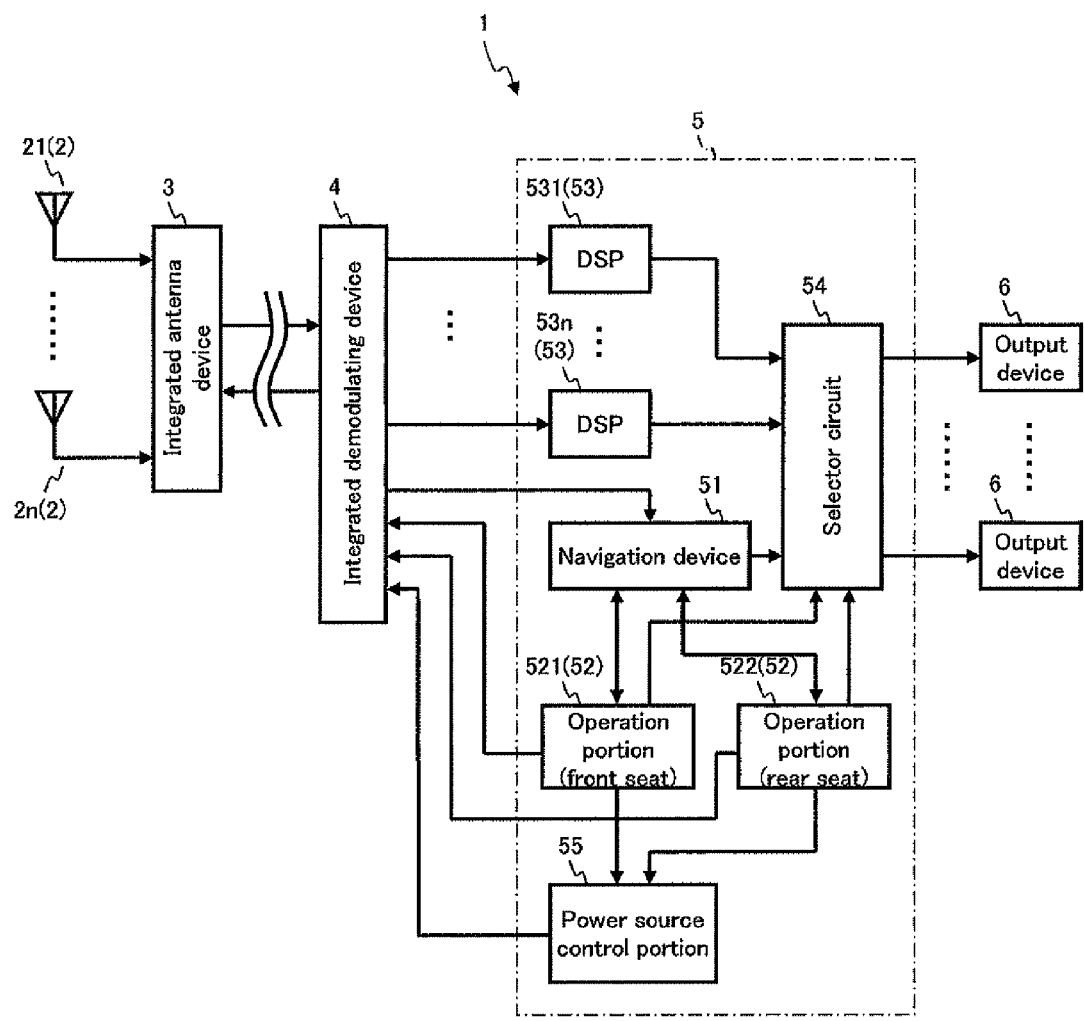
FIG. 2 is a block configuration diagram of an integrated receiving device.

Referring to FIG. 2, an integrated receiving device 1 is configured to include an integrated antenna device 3 for receiving broadcasting waves of a plurality of systems at a plurality of antennas 2 (21 to 2n), an integrated demodulating device 4 for demodulating the received broadcasting waves, and a navigation system 5 with a function to output input signals from the integrated demodulating device 4 to output devices 6 (61 to 6n) of a plurality of systems.

The output devices 6 of a plurality of systems refer to a plurality of speakers serving as output destinations of audio signals, and a plurality of liquid crystal touch panel displays serving as output destinations of video signals.

The plurality of antennas 2 include dual-system antennas for receiving digital TV broadcasting waves, antennas for receiving AM broadcasting waves, dual-system antennas for receiving FM broadcasting waves, antennas for receiving location information used with GPS (Global Positioning System), antennas for radio communication used with ETC (Electronic Toll Collection) and the like, and antennas for receiving road traffic information used with VICS (Vehicle Information Communication System) and the like.

The navigation system 5 is configured to include: a navigation device 51 including a map data storing portion that stores road map data, a GPS receiving portion for recognizing location information of the corresponding vehicle input from the antennas 2 through the integrated demodulating device 4, an autonomous navigation portion for managing travel states of the corresponding vehicle, and a route searching portion for searching for a route to a destination designated on the basis of map data; and a system control portion for setting various operation modes and operation conditions.

The navigation system 5 includes a single CPU or a plurality of CPUs, ROM that stores operation programs for CPU, and RAM used for a working area, so as to control the above-described blocks, thereby implementing a navigation function to guide the corresponding vehicle to a designated point.

A housing of the navigation system 5 is provided, for example, on an inner panel between the driver's seat and the passenger seat of the vehicle.

The navigation system 5 includes a plurality of operation switches 52 (hereinafter called operation portions) configured to select a signal system so that an audio signal or a video signal generated on the basis of the demodulated signal output from the integrated demodulating device 4 is output to one of the output devices 6 of a plurality of systems.

Specifically, the operation portions 52 each comprise hardware switches provided on the housing of the navigation system 5 or software switches displayed on a liquid crystal touch panel display.

The operation portions 52 are each configured to control a selector circuit 54 on the basis of a switch operation so as to output particular information or a particular signal to a corresponding output device 6, the particular information or particular signal being selected from among map information and location information from the navigation device 51 or among an audio signal and a video signal input from the integrated demodulating device 4 and subjected to predetermined processing at a digital signal processor (DSP) 53.

The operation portions 52 are provided for a plurality of systems. FIG. 2 shows the configuration in which a front portion seat (front seat) and a rear portion seat (rear seat) are each provided with an operation portion 52.

Individually handling operation portions 521 and 522 results in output of respective selected information or signal; for example, a user sitting on the front seat handles the front-seat operation portion 521 so as to display information from the navigation device 51 on the liquid crystal touch panel display, while a user sitting on the rear seat handles the rear-seat operation portion 532 so as to output from speakers provided at the rear seat an audio signal from an FM antenna among the plurality of antennas 21 to 2n.

It should be noted that the plurality of operation portions 52 will not be limited to the two-point configuration of the front seat and the rear seat. For example, each of the seats (four seats in the case of a four-seater vehicle) may be provided with an operation portion 52. Alternatively, a single operation portion 52 may be provided at a single position.

Figure 3:
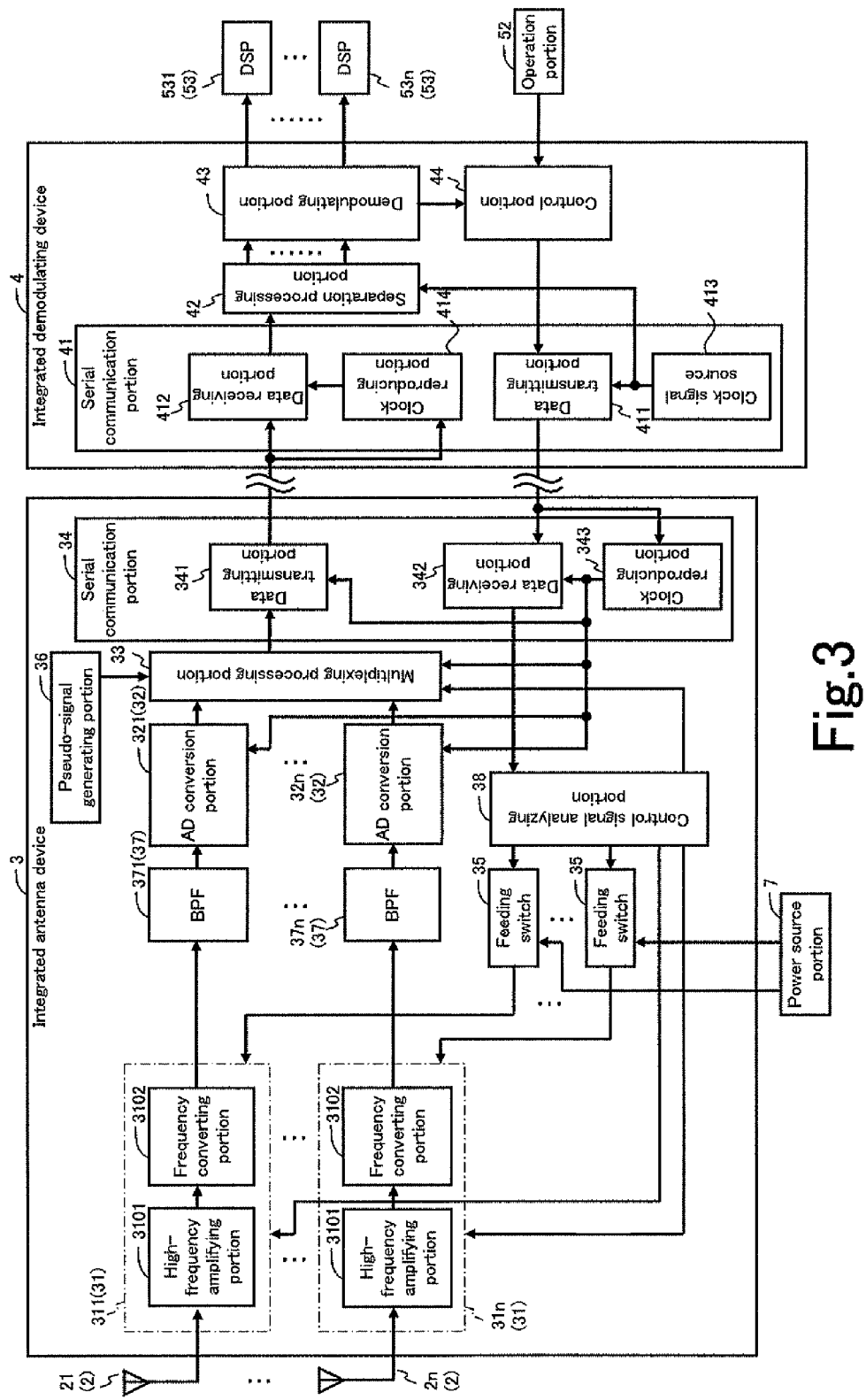
FIG. 3 is a block configuration diagram of an integrated antenna device and an integrated demodulating device.

Referring to FIG. 3, the integrated antenna device 3 is disposed near a plurality of antennas 2 (21 to 2n) of mutually different signal systems and includes: a plurality of tuner units 31 (311 to 31n) each having a high-frequency amplifying portion 3101 for amplifying a high frequency signal received at a corresponding antenna 2 and a frequency converter 3102 (hereinafter called a frequency converting portion) configured to convert the amplified high frequency signal into an intermediate frequency signal; AD converters 32 (321 to 32n) (hereinafter called AD conversion portions) configured to convert output signals of the tuner units 31 into digital signals; a multiplexing processing portion 33 (hereinafter called a multiplexing processing portion) configured to multiplex the received digital signals AD-converted at the AD conversion portion 32; and a serial communicator 34 (hereinafter called a serial communication portion) configured to output to the outside (to the integrated demodulating device 4 in FIG. 3) a received multiplex digital signal multiplexed at the multiplexing processing portion 33 and for receiving a control signal from the outside.

Additionally, the integrated antenna device 3 includes: a power-feeding switch 35 for individually controlling power feeding of the tuner units on the basis of the control signal received at the serial communication portion 34; a pseudo-signal generator 36 (hereinafter called a pseudo-signal generating portion) configured to generate a pseudo-signal that simulates an output signal of the AD converting portion 32; band pass filters 37 (371 to 37n) for allowing signals of desired frequency components to pass through the filters; and a control signal analyzing portion 38 for analyzing the control signal from the integrated demodulating device 4.

The tuner units 31 each comprise: a CAN tuner that mounts therein an integrated circuit incorporating a plurality of members for analogue signal processing such as coil and diode, a PLL circuit, and the like; a silicon tuner in which the analogue members mounted in the CAN tuner are integrated into a circuit; or the like.

Figure 4A:
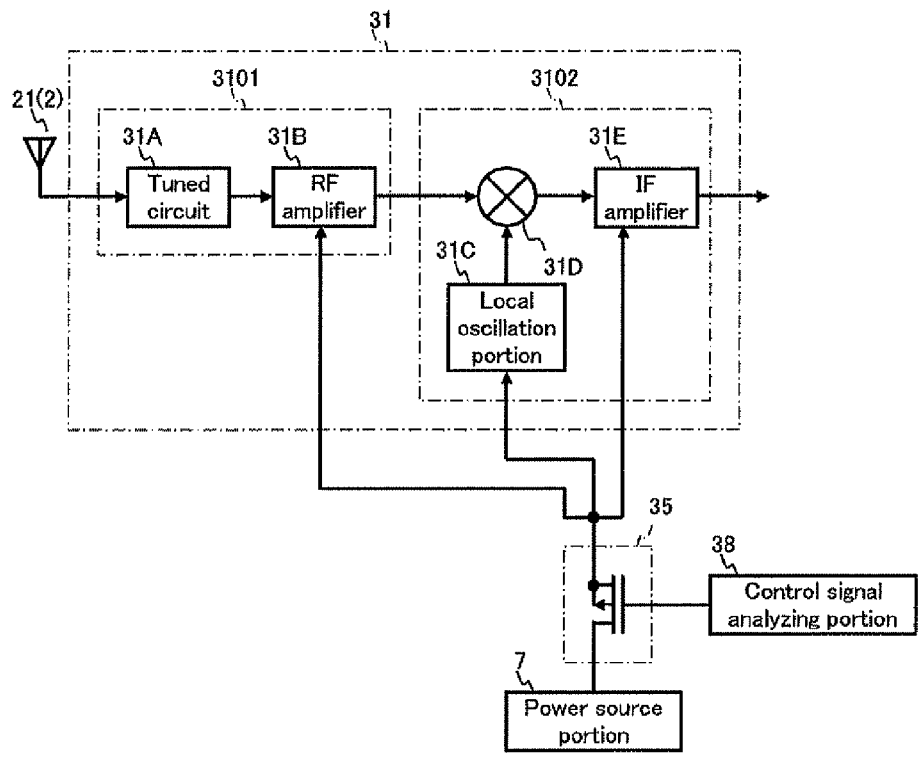
FIG. 4A is a block configuration diagram of a tuner unit that receives AM broadcasting waves or FM broadcasting waves.

Referring to FIG. 4A, a tuner unit 31 for receiving AM broadcasting waves or FM broadcasting waves includes: a tuned circuit 31A for outputting, among received signals received at the antenna 2, a received signal (RF signal) of a frequency band that corresponds to a broadcasting station selected through the operation portion 52; an RF amplifier 31B for amplifying the RF signal; a local oscillation portion 31C for, in order to convert the RF signal down to an IF signal with a lower frequency, generating a signal of a frequency that is the difference between the frequencies of the RF signal and the IF signal; a mixer 31D for generating the IF signal by multiplying the RF signal and the output signal of the local oscillation portion 31C; and an IF amplifier 31E for amplifying the IF signal.

Figure 4B:
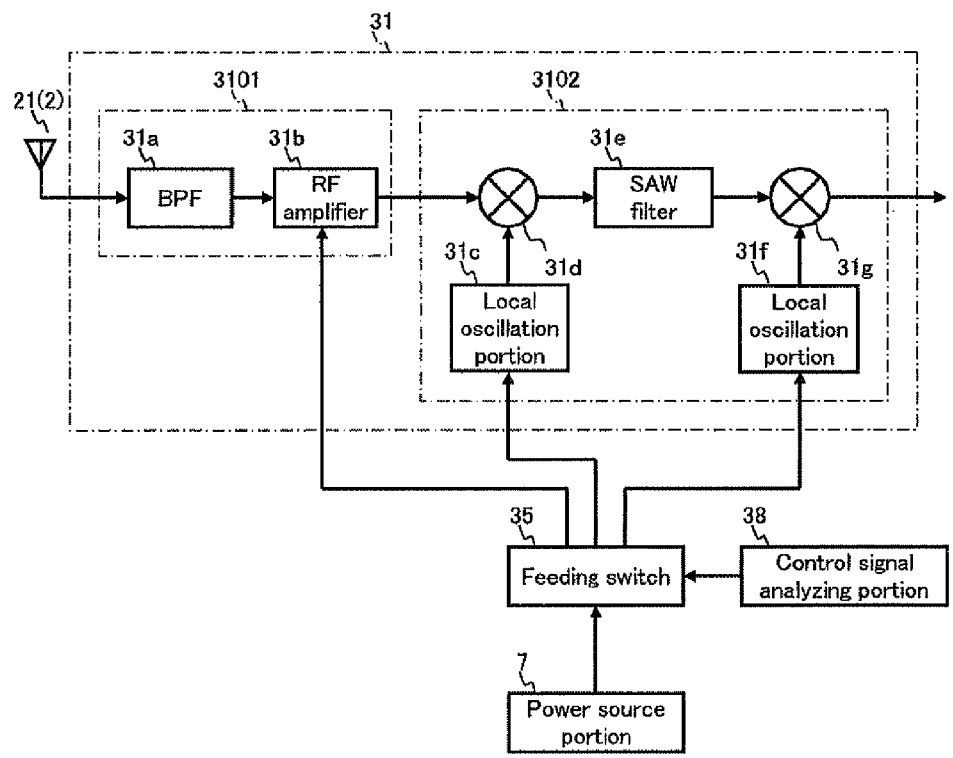

Referring to FIG. 4B, a tuner unit 31 for receiving digital broadcasting waves of a digital TV, a digital radio, and the like includes: a band pass filter 31a for allowing a signal, among received signals (RF signals) received at the antenna 2, that has a desired frequency to pass through the filter; an RF amplifier 31b for amplifying the RF signal that has passed through the band pass filter 31a; a local oscillator 31c and a mixer 31d for converting the RF signal into a signal of a different frequency; a SAW filter 31e for allowing a signal, among output signals of the mixer 31d, that has a desired frequency to pass through the filter; and a second local oscillator 31f and a mixer 31g for converting the output signal of the SAW filter 31e into a signal of a different frequency.

In this embodiment, the power-feeding switch 35 individually controls power feeding of the RF amplifier 31B, the local oscillation portion 31C, the IF amplifier 31E, the RF amplifier 31b, and the local oscillators 31c and 31f. It should be noted that the blocks to be controlled by the power-feeding switch 35 will not be limited to those described above. The power-feeding switch 35 will be described in detail later.

Among received analogue signals that are frequency-converted at the tuner units 31, desired frequency components are allowed to pass through the band pass filters 37 and input to the AD conversion portions 32, and received digital signals AD-converted at the AD conversion portion 32 are input to the multiplexing processing portion 33.

Figure 5:
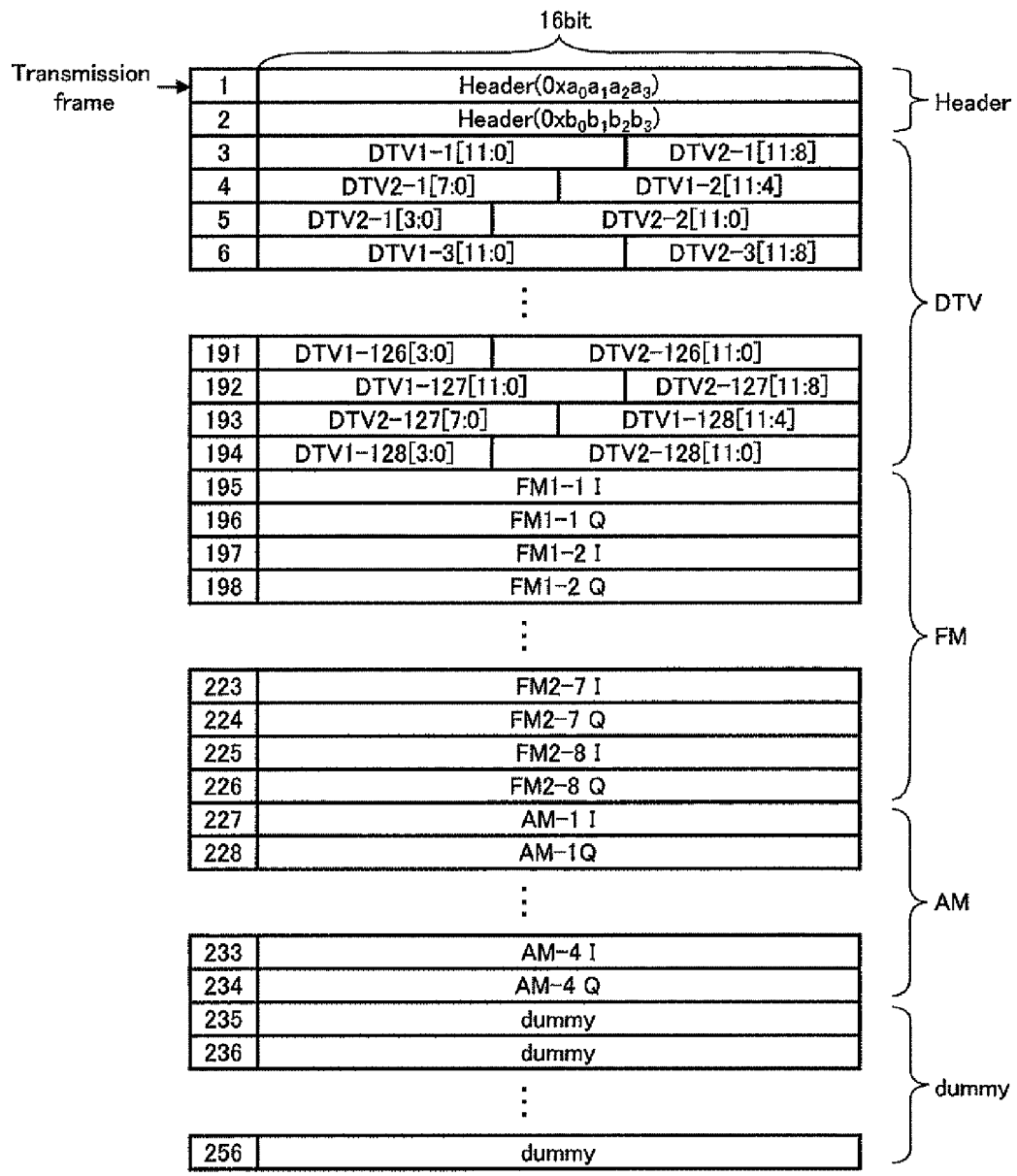
FIG. 5 is a diagram illustrating a transfer block.

Referring to FIG. 5, at a predetermined timing, the multiplexing processing portion 33 allocates each of the received digital signals of a plurality of signal systems corresponding to the antennas 2 to a respective, predetermined transmission frame of 16 bits constituting 1 transmission frame, among 256 frames constituting one-time transfer block. The predetermined timing, as used herein, refers to a timing of rise of a synchronous clock signal reproduced by a clock reproducing portion, described later, on the basis of the control signal from the integrated demodulating device 4.

For example, description will be made of the transfer block in the case of receiving digital TV, AM, and FM broadcasting waves. Referring to FIG. 5, the first transmission frame and the second transmission frame of the transfer block store header data of predetermined bits ($0xa_0a_1a_2a_3$ for the first transmission frame and $0xb_0b_1b_2b_3$ for the second transmission frame).

The third through 194th transmission frames of the transfer block store received digital signals of digital TV. Channel data of the received digital signal of digital TV received from a dual-system antenna 2 is divided into 128 pieces of 12-bit data and stored in the transfer block alternately on a 12 bit basis.

The 195th through 226th transmission frames of the transfer block store the received digital signal of FM broadcasting. Channel data of the received digital signal of FM broadcasting received from a dual-system antenna 2 is divided into 16 pieces of 16-bit data, and one type of channel data are stored in the 195th through 210th transmission frames, while the other type of channel data are stored in the 211th through 226th transmission frames. The channel data is stored in such a manner that data of I component and data of Q component alternate with each other on a 16-bit basis.

The 227th through 234th transmission frames of the transfer block store received digital signal of AM broadcasting. Data of the received digital signal of AM broadcasting is divided into 8 pieces of 16-bit data and stored in such a manner that data of I component and data of Q component alternate with each other on a 16-bit basis.

The 235th through 256th transmission frames of the transfer block store a pseudo signal. The pseudo signal, as used herein, refers to a predetermined random data signal generated at the pseudo-signal generating portion 36 and by, for example, PRBS (Pseudo Random Binary Sequence) or the like. The multiplexing processing portion 33 reads the pseudo signal and stores it in the 235th through 256th transmission frames of the transfer block.

The serial communication portion 34 includes a data transmitter 341 (hereinafter called a data transmitting portion) configured to transmit a received multiplex digital signal to the integrated demodulating device 4, a data receiver 342 (hereinafter called a data receiving portion) configured to receive a control signal from the integrated demodulating device 4, and a clock reproducing portion 343 for reproducing a synchronous clock signal on the basis of a synchronous clock signal generated at a clock signal source provided in the integrated demodulating device 4.

The data transmitting portion 341 includes a buffer memory for temporarily storing input data, and a parallel-serial conversion circuit for converting the data stored in the buffer memory from parallel data into serial data. The data transmitting portion 341 carries out serial transmission of the received multiplex digital signal to the integrated demodulating device 4, starting from the first transmission frame of the transfer block and in increasing order.

The data receiving portion 342 includes a serial-parallel conversion circuit for converting the input data from the integrated demodulating device 4 into parallel data from serial data, and a buffer memory for temporarily storing the parallel data converted at the serial-parallel conversion circuit, and is configured to output to the control signal analyzing portion 38 the control signal from the integrated demodulating device 4.

The clock reproducing portion 343 includes a PLL circuit for generating a synchronous clock signal on the basis of a synchronization training signal comprising header data and a pseudo signal. The synchronization training signal is a predetermined signal received from the integrated demodulating device 4, examples including a signal received from the integrated demodulating device 4 at the time of activation of the integrated antenna device 3.

The synchronization training signal is a signal that is synchronous with a synchronous clock signal that has a frequency acting as an operation standard and that is generated at the clock signal source provided in the integrated demodulating device 4.

The synchronization training signal comprises, for example, header data stored in the first transmission frame and pseudo-noise data by PRBS or the like stored in the rest of the transmission frames, and thus is predetermined data necessary for reproducing a synchronous clock.

The synchronization training signal is repeatedly transmitted for a predetermined number of times to the data receiving portion 342 before the integrated demodulating device 4 transmits the control signal. It will be readily appreciated that the pseudo signal is not limited to the PRBS system insofar as the signal stores predetermined data, such as pseudo-noise data, necessary for reproducing a synchronous clock.

Specifically, the PLL circuit reads the header data of the synchronization training signal transmitted repeatedly for a predetermined number of times, generates a synchronous clock signal on the basis of the transmission intervals of the header data, and carries out feedback so as to secure the potential difference between the generated synchronous clock signal and the input synchronization training signal within a predetermined range.

Referring to FIG. 3, the power-feeding switch 35 is provided for each antenna 2 and comprises MOSFET, as shown in FIG. 4A. The MOSFET switches between power feeding and non-power feeding of each block from a power source portion 7 provided near the integrated antenna device 3 by switching between ON and OFF states of the MOSFET on the basis of power-feeding control data input to a gate terminal of the MOSFET.

The power-feeding control data is a control signal transmitted from the outside and is data determined on the basis of the signal system selected by handling of the operation portion 52.

That is, referring to FIG. 2, the navigation system 5 includes a power source controller 55 (hereinafter called a power source control portion) configured to output to a control portion 44 of the integrated demodulating device 4 the power-feeding control data, which is a control signal for stopping power feeding of tuner units 31 of signal systems other than a signal system selected through each operation portion 52.

For example, in the case where the power-feeding switch 35 comprises MOSFET as shown in FIG. 4A, the power-feeding control data is such data that the MOSFET corresponding to the selected signal system is turned OFF by turning input to the gate terminal of the MOSFET into low level, while the other MOSFETs are turned ON by turning input to the gate terminals of the MOSFETs into high level. The allotment of high level or low level to the power-feeding switch 35 is carried out by the control signal analyzing portion 38, described later.

The power-feeding control data may include a plurality of control data to correspond to a plurality of signal systems to be stopped from being fed power. That is, the integrated receiving device 1 may be configured such that a plurality of signal systems are selectable by handling of the operation portions 52.

The pseudo-signal generating portion 36 comprises a bit pattern generator for generating and outputting the above-described pseudo signal. The pseudo-signal generating portion 36 may be configured to include a random data storage memory for storing pseudo signals of a plurality of patterns so as to read data stored in the random data storage memory and output the data. These are used as part of the synchronization training signal for clock reproduction at the clock reproducing portion 414.

The control signal analyzing portion 38 sorts control signals received from the integrated demodulating device 4 through the data receiving portion 342 into gain control data, power-feeding control data, station selection data, and the like, described later. The station selection data, as used herein, refers to data of the frequency band of a broadcasting station selected by a user's handling of the operation portion 52.

Then the control signal analyzing portion 38 outputs the gain control data to the tuner unit 31, outputs the power-feeding control data to a plurality of power-feeding switches 35 and to the multiplexing processing portion 33, and outputs the station selection data to the tuned circuit 31A.

The multiplexing processing portion 33 is configured to use a pseudo signal generated at the pseudo-signal generating portion 36 instead of a received digital signal corresponding to a tuner unit 31 that is stopped from being fed power by the power-feeding switch 35.

Specifically, the multiplexing processing portion 33 determines areas of the transmission frames to which the pseudo signal is inserted on the basis of the power-feeding control data input from the control signal analyzing portion 38.

For example, in the case where a tuner unit 31 corresponding to FM broadcasting is stopped from being fed power, the control signal analyzing portion 38 transmits power-feeding control data indicating the stoppage to the multiplexing processing portion 33. Upon receipt of the power-feeding control data, the multiplexing processing portion 33 inserts the pseudo signal to the 195th through 234th transmission frames of the transfer block.

Referring to FIG. 3, the integrated demodulating device 4 includes: a serial communicator 41 (hereinafter called a serial communication portion) configured to receive a received multiplex digital signal transmitted from the integrated antenna device 3 and to output a control signal to the integrated antenna device 3; a separation processor 42 (hereinafter called a separation processing portion) configured to separate the received multiplex digital signal into received digital signals on a signal system basis; a demodulator 43 (hereinafter called a demodulating portion) configured to demodulate the received digital signals separated at the separation processing portion 42; and a controller 44 (hereinafter called a control portion) configured to output to the integrated antenna device 3 a control signal for stopping power feeding of at least tuner units 31 of signal systems other than a signal system selected through the operation portion 52.

The serial communication portion 41 includes: a data transmitter 411 (hereinafter called a data transmitting portion) configured to transmit a control signal to the integrated antenna device 3; a data receiver 412 (hereinafter called a data receiving portion) configured to receive a received multiplex digital signal from the integrated antenna device 3; a clock signal source 413 for generating a synchronous clock signal; and a clock reproducing portion 414 for reproducing a synchronous clock signal on the basis of the synchronous clock signal generated at the clock reproducing portion 343 of the integrated antenna device 3.

The internal configurations of the data transmitting portion 411, the data receiving portion 412, and the clock reproducing portion 414 are respectively the same as those of the data transmitting portion 341, the data receiving portion 342, and the clock reproducing portion 343.

The clock signal source 413 comprises an oscillator for making a frequency that act as a standard for operation of the integrated receiving device 1, and the like, and as the oscillator, a crystal oscillator or a ceramic oscillator respectively using crystal and ceramic is employed.

While in this embodiment description is made of the configuration in which the integrated antenna device 3 includes the clock reproducing portion 343 and the integrated demodulating device 4 includes the clock signal source 413 and the clock reproducing portion 414, such configuration is also possible that inversely, the integrated antenna device 3 includes the clock signal source 413 and the clock reproducing portion 414, while the integrated demodulating device 4 includes the clock reproducing portion 343.

The separation processing portion 42 carries out processing opposite to the processing by the multiplexing processing portion 33 with respect to the data constituting the received multiplex digital signal multiplexed at the multiplexing processing portion 33, that is, the data allocated to the transfer block composed of the 256 transmission frames, thereby separating the received multiplex digital signal into received digital signals on a signal system basis received at the integrated antenna device 3, and outputs the received digital signals to the demodulating portion 43.

The demodulating portion 43 demodulates the received digital signals and outputs them to the DSP 53. In this regard, the demodulating portion 43 is configured to carry out gain control on the basis of the received digital signals and act as a feedback control portion for adjusting the gain of the high-frequency amplifying portion 3101 so that each received digital signal is maintained at a predetermined target level.

For example, when a comparison shows that there is a large deviation between each received digital signal and the target level, the demodulating portion 43 outputs gain control data that is based on the deviation to the control portion 44. The gain control data output from the control portion 44 is transmitted to the high-frequency amplifying portion 3101 through the control signal analyzing portion 38 so that the gain of the high-frequency amplifying portion 3101 is variable-controlled to make the deviation small.

The control portion 44 outputs to the control signal analyzing portion 38 a control signal that is a signal including the gain control data from the demodulating portion 43 and the power-feeding control data and station selection data from the operation portion 52.

Additionally, the control portion 44 outputs to the integrated antenna device 3 a control signal for stopping power feeding of tuner units 31 of signal systems other than a signal system selected through the operation portion 52, the non-fed tuner units excluding a tuner unit 31 of a signal system for receiving road traffic information.

That is, the tuner unit 31 of the signal system for receiving road traffic information is continuously fed power, and only the other tuner units 31 are controlled as to whether to be fed power or not fed power using the power-feeding control data.

In this regard, examples of the signal system for receiving road traffic information include a signal system for receiving radio communication used for the above-described ETC and the like, and a signal system for receiving road traffic information used for VICS and the like.

In such signal systems, road traffic information and the like are transmitted at variable timings depending on the present location of the vehicle, and thus may be continuously fed power to secure receipt of the road traffic information and the like.

Alternatively, the control portion 44 may be configured to output to the integrated antenna device 3 a control signal for stopping power feeding of tuner units 31 of signal systems other than a signal system selected through the operation portion 52, the non-fed tuner units excluding a tuner unit 31 of a signal system for receiving data broadcasting.

Examples of the signal system for receiving data broadcasting include a signal system for receiving broadcasting waves of a digital TV, and a signal system for receiving broadcasting waves of FM broadcasting in the case where the integrated receiving device 1 is text broadcasting enabled.

Keeping the power feeding of such signal systems in an ever ON state enables text information and image information of digital TV and FM to be continuously displayed on the liquid crystal touch panel display or the like, irrespective of the signal system selected by the driver or the like.

Alternatively, the control portion 44 may be configured to output to the integrated antenna device 3 a control signal for stopping power feeding of tuner units 31 of signal systems other than a signal system 31 selected through the operation portion 52, the non-fed tuner units excluding a tuner unit 31 of a signal system for receiving a signal from a GPS satellite.

Similarly to the case of data broadcasting, keeping the power feeding of such signal systems in an ever ON state enables map information and the like sent from the GPS satellite to be continuously displayed on the liquid crystal touch panel display or the like, irrespective of the signal system selected by the driver or the like.

Alternatively, the control portion 44 may be configured to output to the integrated antenna device 3 a control signal for stopping power feeding of tuner units 31 of signal systems other than a signal system selected through the operation portion 52, the non-fed tuner units excluding tuner units 31 of a plurality of signal systems among the signal system for receiving road traffic information, the signal system for receiving data broadcasting, and the signal system for receiving a signal from a GPS satellite.

Other embodiments will be described below.

While in the above-described embodiment description is made of the configuration in which the continuously power-fed particular tuner units 31 (the tuner units 31 for receiving signals from, for example, road traffic information, data broadcasting, and the GPS satellite) are set by the control portion 44 provided in the integrated demodulating device 4, such a configuration is possible that a device outside the integrated demodulating device 4, such as the navigation system 5, sets the continuously power-fed particular tuner units 31.

Figure 6:
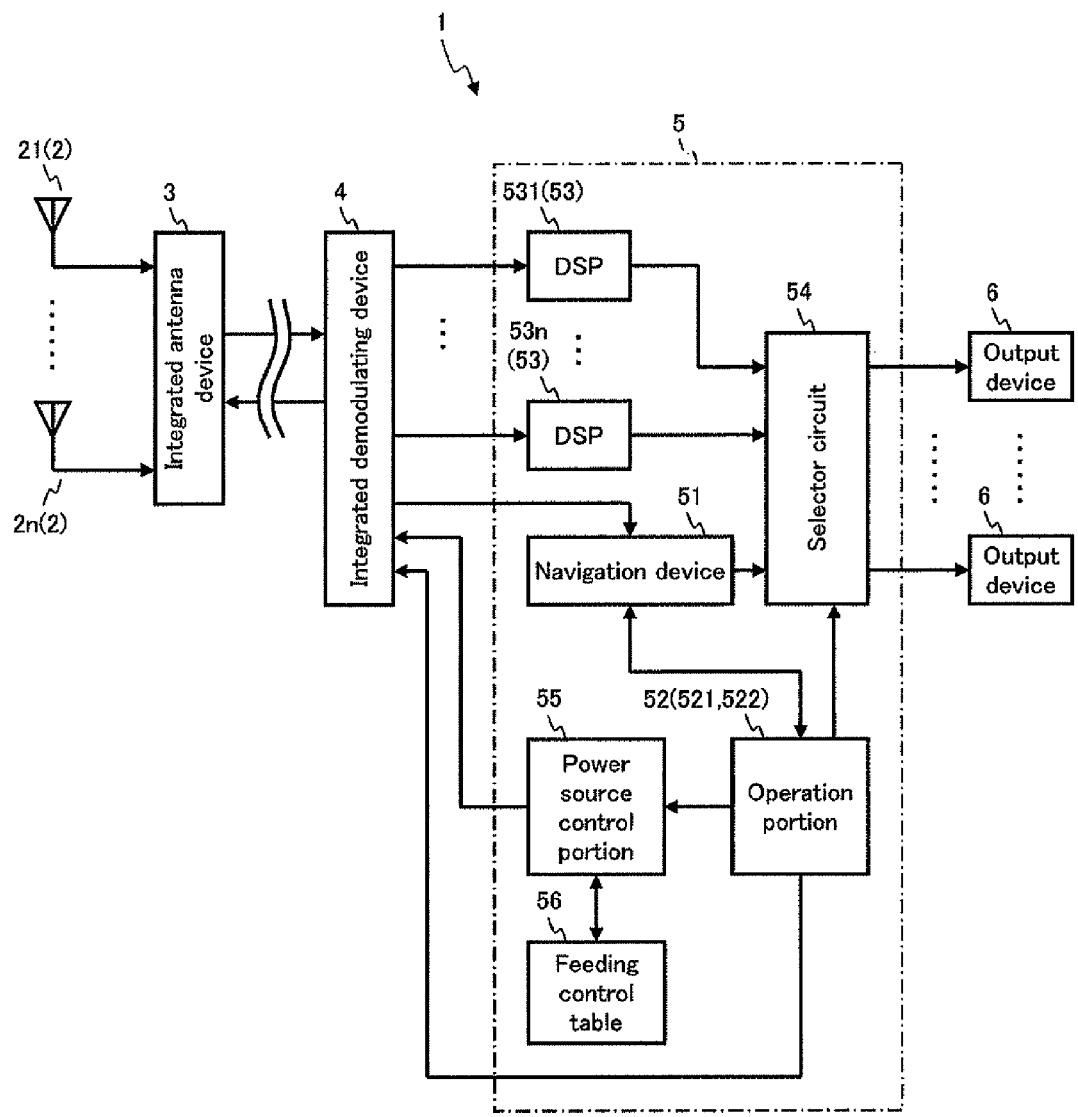
FIG. 6 is a block configuration diagram of an integrated receiving device that includes a power-feeding control table.

For example, referring to FIG. 6, the navigation system 5 may include a power-feeding control table 56 for identifying a signal system corresponding to a tuner unit 31 that continuously needs to be fed power such that the power source control portion 55 outputs to the control portion 44 a control signal for stopping power feeding of a tuner unit 31 of a signal system, among the signal systems other than a signal system selected through the operation portion 52, that is unidentified by the power-feeding control table 56.

The power-feeding control table 56 is configured as table data stored in ROM of the navigation system 5. This table data comprises, for example, all the signal systems received by the integrated receiving device 1 at the antennas 2, and flags indicating necessity or unnecessity of continuous power feeding of each of the signal systems. Changing the setting of the flags enables the continuously power-fed signal system to be changed.

Figure 7:
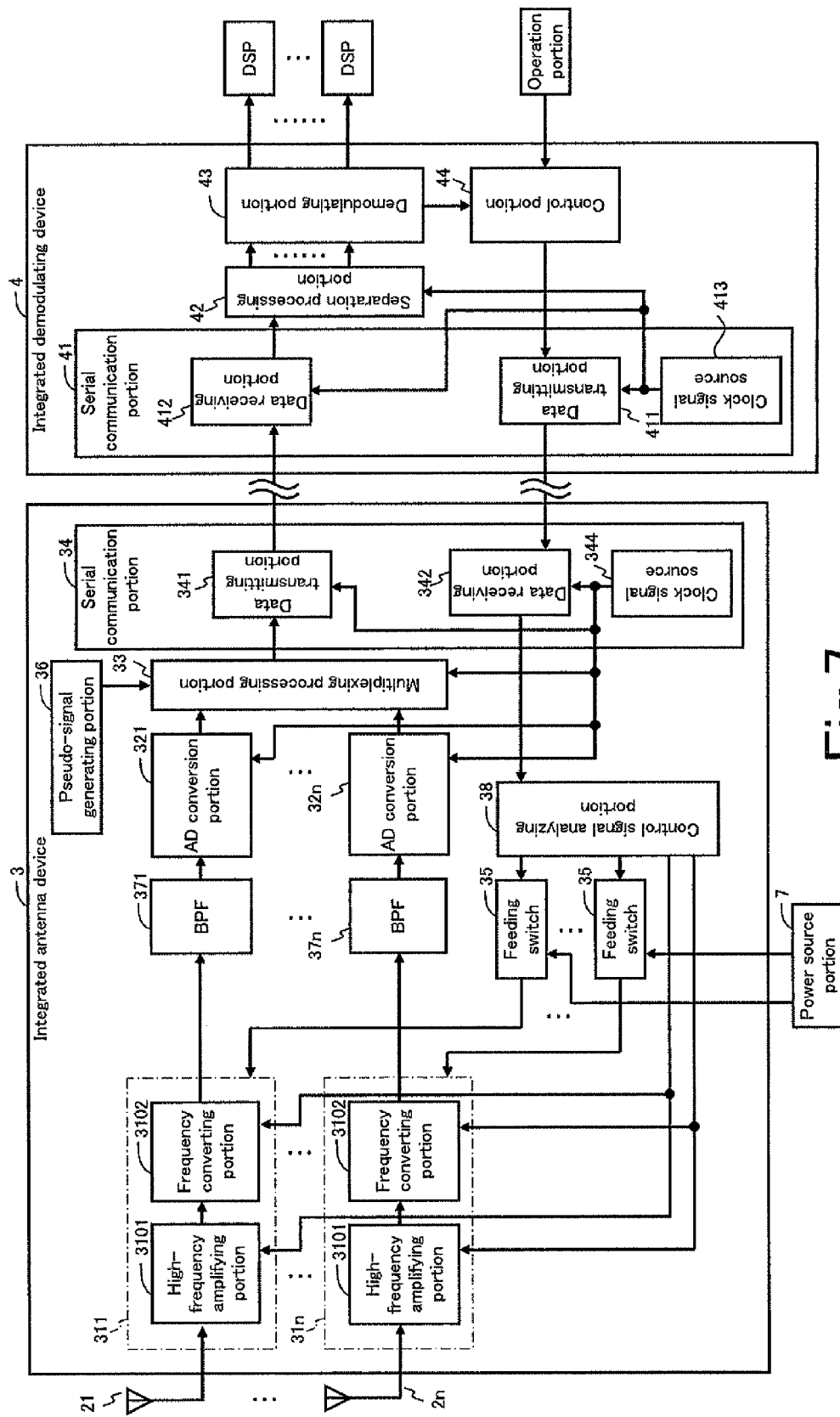
FIG. 7 is a block configuration diagram in the case where the integrated antenna device and the integrated demodulating device each include a clock signal source.

While in the above-described embodiment description is made of the configuration in which the integrated antenna device 3 and the integrated demodulating device 4 include clock reproducing portions such that the clock reproducing portion of each device reproduces a synchronous clock signal on the basis of a synchronization training signal transmitted from the other device, such a configuration is possible that the integrated antenna device 3 and the integrated demodulating device 4 respectively include clock signal sources 344 and 413 as shown in FIG. 7 such that the data transmitting portion 341, data receiving portions 342 and 412 operate synchronously with synchronous clock signals generated at the respective clock signal sources.

In this case, since synchronous clock signals are generated independently at both devices, there is no need for transmission of a pseudo signal containing pseudo-noise data by PRBS or the like necessary for reproducing synchronous clocks, and thus such a configuration is possible that zero character codes, i.e., null character codes, or optional random number data generated by a mixed congruential method or the like may be stored instead of the pseudo-noise data.

While in the above-described embodiment description is made of the configuration in which the tuner unit 31 includes the high-frequency amplifying portion 3101 and the frequency converting portion 3102, the blocks constituting the tuner unit 31 will not be limited to the foregoing. For example, such a configuration is possible that the tuner unit 31 includes a band pass filter 37 and an AD conversion portion 321, in addition to the high-frequency amplifying portion 3101 and the frequency converting portion 3102.

While in the above-described embodiment description is made of the configuration in which the integrated receiving device 1 includes the navigation system 5, when the integrated receiving device 1 has no navigation function such as when the integrated receiving device 1 deals only with reception of FM broadcasting and AM broadcasting, such a configuration is possible that the integrated receiving device 1 has an alternative system for the navigation system 5. For example, such a configuration is possible that the navigation system 5 is replaced with an audio system having an audio-visual function with such a configuration that the navigation device 51 is removed from the above-described embodiment.

The above-described embodiments are provided as examples of the present invention, and it will be readily appreciated that the specific configurations of the blocks may be conveniently modified insofar as the advantageous effects of the present invention will be secured.

The invention claimed is:

1. An integrated antenna device disposed near a plurality of antennas of mutually different signal systems, the integrated antenna device comprising:
   a plurality of tuner units each having a frequency converter configured to convert a high frequency signal received at a corresponding one of the antennas into an intermediate frequency signal;
   an AD converter configured to convert output signals of the tuner units into digital signals;
   a multiplexing processor configured to multiplex the received digital signals AD-converted at the AD converter;
   a serial communicator configured to output, to an outside, a received multiplex digital signal multiplexed at the multiplexing processor and to receive a control signal from the outside;
   a power-feeding switch for individually controlling power feeding of the tuner units on the basis of the control signal received at the serial communicator; and
   a pseudo-signal generator configured to generate a pseudo-signal that simulates an output signal of the AD converter,
   wherein the multiplexing processor uses the pseudo-signal generated at the pseudo-signal generator instead of a received digital signal corresponding to a tuner unit that is stopped from being fed power by the power-feeding switch.

2. An integrated demodulating device comprising:
   a serial communicator configured to receive a received multiplex digital signal transmitted from the integrated antenna device according to claim 1 and to output a control signal to the integrated antenna device;
   a separation processor configured to separate the received multiplex digital signal into received digital signals on a signal system basis;
   a demodulator configured to demodulate the received digital signals separated at the separation processor; and
   a controller configured to output to the integrated antenna device a control signal for stopping power feeding of at least two tuner units of signal systems other than a signal system selected through an operation portion.

3. The integrated demodulating device according to claim 2, wherein the controller outputs to the integrated antenna device a control signal for stopping power feeding of tuner units of signal systems other than the signal system selected through the operation portion, the non-fed tuner units excluding a tuner unit of a signal system for receiving road traffic information.

4. The integrated demodulating device according to claim 2, wherein the controller outputs to the integrated antenna device a control signal for stopping power feeding of tuner units of signal systems other than the signal system selected through the operation portion, the non-fed tuner units excluding a tuner unit of a signal system for receiving data broadcasting.

5. The integrated demodulating device according to claim 2, wherein the controller outputs to the integrated antenna device a control signal for stopping power feeding of tuner units of signal systems other than the signal system selected through the operation portion, the non-fed tuner units excluding a tuner unit of a signal system for receiving a signal from a GPS satellite.

6. An integrated receiving device comprising:
   an integrated antenna device disposed near a plurality of antennas of mutually different signal systems, the integrated antenna device comprising:
   a plurality of tuner units each having a frequency converter configured to convert a high frequency signal received at a corresponding one of the antennas into an intermediate frequency signal;
   an AD converter configured to convert output signals of the tuner units into digital signals;
   a multiplexing processor configured to multiplex the received digital signals AD-converted at the AD converter;
   a serial communicator including a data transmitter configured to output to an integrated demodulating device a received multiplex digital signal multiplexed at the multiplexing processor and a data receiver configured to receive a control signal from the integrated demodulating device;
   a power-feeding switch for individually controlling power feeding of the tuner units on the basis of the control signal received at the serial communicator; and
   a pseudo-signal generator configured to generate a pseudo-signal that simulates an output signal of the AD converter,
   wherein the multiplexing processor uses the pseudo-signal generated at the pseudo-signal generator instead of a received digital signal corresponding to a tuner unit that is stopped from being fed power by the power-feeding switch;

an integrated demodulating device, the integrated demodulating device comprising:

a serial communicator including a data receiver configured to receive a received multiplex digital signal transmitted from the integrated antenna device and a data transmitter configured to output a control signal to the integrated antenna device;

a separation processor configured to separate the received multiplex digital signal into received digital signals on a signal system basis;

a demodulator configured to demodulate the received digital signals separated at the separation processor; and a controller configured to output to the integrated antenna device a control signal for stopping power feeding of tuner units of signal systems other than a signal system selected;

a plurality of operation switches configured to select the signal system so as to output to any one of output devices of a plurality of systems an audio signal or a video signal generated on the basis of a demodulated signal output from the integrated demodulating device; and a power source controller configured to output to the controller a control signal for stopping power feeding of tuner units of signal systems other than signal systems selected through the operation switches.

7. The integrated receiving device according to claim 6, further comprising a power-feeding control table for identifying a signal system corresponding to a tuner unit that needs to be continuously fed power, wherein the power source controller outputs to the controller a control signal for stopping power feeding of a tuner unit of a signal system unidentified by the power-feeding control table among the signal systems other than the signal systems selected through the operation switches.

8. The integrated receiving device according to claim 6, wherein the controller outputs to the integrated antenna device a control signal for stopping power feeding of tuner units of signal systems other than the signal system selected through the operation switch, the non-fed tuner units excluding a tuner unit of a signal system for receiving road traffic information.

9. The integrated receiving device according to claim 6, wherein the controller outputs to the integrated antenna device a control signal for stopping power feeding of tuner units of signal systems other than the signal system selected through the operation switch, the non-fed tuner units excluding a tuner unit of a signal system for receiving data broadcasting.

10. The integrated receiving device according to claim 6, wherein the controller outputs to the integrated antenna device a control signal for stopping power feeding of tuner units of signal systems other than the signal system selected through the operation switch, the non-fed tuner units excluding a tuner unit of a signal system for receiving a signal from a GPS satellite.

* * * * *